United States Patent
Ramalingam et al.

(10) Patent No.: US 9,192,946 B2
(45) Date of Patent: Nov. 24, 2015

(54) HYDROCLONE

(71) Applicant: Dow Global Technologies LLC, Midland, MI (US)

(72) Inventors: Santhosh K. Ramalingam, Pearland, TX (US); Christopher J. Siler, Hemlock, MI (US); Steven D. Jons, Eden Prairie, MN (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/429,005

(22) PCT Filed: Oct. 9, 2013

(86) PCT No.: PCT/US2013/063960
§ 371 (c)(1),
(2) Date: Mar. 18, 2015

(87) PCT Pub. No.: WO2014/066036
PCT Pub. Date: May 1, 2014

(65) Prior Publication Data
US 2015/0224517 A1    Aug. 13, 2015

Related U.S. Application Data

(60) Provisional application No. 61/718,751, filed on Oct. 26, 2012.

(51) Int. Cl.
*B04C 3/00* (2006.01)
*B04C 3/06* (2006.01)
(Continued)

(52) U.S. Cl.
CPC .............. *B04C 9/00* (2013.01); *B01D 21/0012* (2013.01); *B01D 21/0042* (2013.01);
(Continued)

(58) Field of Classification Search
CPC .............. B04C 3/00; B04C 3/06; B04C 9/00; B04C 2009/004; B01D 21/2488; B01D 21/0012; B01D 21/0042; B01D 21/267
See application file for complete search history.

(56) References Cited

U.S. PATENT DOCUMENTS

| | | |
|---|---|---|
| 431,448 A | 7/1890 | Dixon |
| 1,107,485 A | 8/1914 | Bowser |

(Continued)

FOREIGN PATENT DOCUMENTS

| | | |
|---|---|---|
| DE | 8913709 | 4/1990 |
| DE | 4420730 | 5/1995 |

(Continued)

OTHER PUBLICATIONS

DOW Water & Process Solutions, G. Onifer, Oct. 2010, Executive Summary: Clean Filtration Technologies, Inc Turboclone Filter.
(Continued)

*Primary Examiner* — David A Reifsnyder
(74) *Attorney, Agent, or Firm* — Edward W. Black

(57) ABSTRACT

A hydroclone including: a vortex chamber (24) in fluid communication with the inlet (14), a process fluid chamber (32) in fluid communication with the process fluid outlet (20), an effluent separation chamber (30) located between the vortex chamber (24) and process fluid chamber (32) and including an outer circumferential surface (23), a vortex flow barrier (34) located between the vortex chamber (24) and the effluent separation chamber (30), an effluent barrier (36) located between the effluent separation chamber (30) and the process fluid chamber (32) including at least one opening (42') near the outer circumferential surface (23), and an effluent opening (38) centrally located within the effluent separation chamber (30) in fluid communication with the effluent outlet (18); wherein the effluent separation chamber (30) has a median distance (80) between the vortex flow barrier (34) and effluent barrier (36) which is adjustable.

7 Claims, 10 Drawing Sheets

(51) Int. Cl.
 *B04C 9/00* (2006.01)
 *B01D 21/00* (2006.01)
 *B01D 21/24* (2006.01)
 *B01D 21/26* (2006.01)

(52) U.S. Cl.
 CPC ......... *B01D 21/2488* (2013.01); *B01D 21/267* (2013.01); *B04C 3/00* (2013.01); *B04C 3/06* (2013.01); *B04C 2009/004* (2013.01)

(56) References Cited

U.S. PATENT DOCUMENTS

| | | | |
|---|---|---|---|
| 1,919,653 A | 7/1933 | Hill | |
| 2,706,045 A | 4/1955 | Large | |
| 2,788,087 A | 4/1957 | Lenehan | |
| 2,917,173 A | 12/1959 | Rakowsky | |
| 3,061,098 A | 10/1962 | Brezinski | |
| 3,219,186 A | 11/1965 | Polhemus et al. | |
| 3,285,422 A | 11/1966 | Wiley | |
| 3,529,544 A | 9/1970 | Masamitsu | |
| 3,529,724 A | 9/1970 | Maciula et al. | |
| 3,822,533 A | 7/1974 | Oranje | |
| 3,893,914 A | 7/1975 | Bobo | |
| 3,947,364 A | 3/1976 | Laval, Jr. | |
| 4,062,766 A | 12/1977 | Duesling | |
| 4,120,783 A | 10/1978 | Baummer | |
| 4,146,468 A | 3/1979 | Wilson | |
| 4,159,073 A | 6/1979 | Liller | |
| 4,178,258 A | 12/1979 | Papay et al. | |
| 4,216,095 A | 8/1980 | Ruff | |
| 4,298,465 A | 11/1981 | Druffel | |
| 4,414,112 A | 11/1983 | Simpson et al. | |
| 4,575,406 A | 3/1986 | Slafer | |
| 4,596,586 A | 6/1986 | Davies et al. | |
| 4,608,169 A | 8/1986 | Arvanitakis | |
| 4,651,540 A | 3/1987 | Morse | |
| 4,662,909 A | 5/1987 | Durr | |
| 4,698,156 A | 10/1987 | Bumpers | |
| 4,865,751 A | 9/1989 | Smisson | |
| 4,931,180 A | 6/1990 | Darchambeau | |
| 5,104,520 A | 4/1992 | Maronde et al. | |
| 5,116,516 A | 5/1992 | Smisson | |
| 5,188,238 A | 2/1993 | Smisson et al. | |
| 5,227,061 A | 7/1993 | Bedsole | |
| 5,277,705 A | 1/1994 | Anderson et al. | |
| 5,407,584 A | 4/1995 | Broussard, Sr. | |
| 5,466,384 A | 11/1995 | Prevost et al. | |
| 5,478,484 A | 12/1995 | Michaluk | |
| 5,593,043 A | 1/1997 | Ozmerih | |
| 5,879,545 A | 3/1999 | Antoun | |
| 5,972,215 A | 10/1999 | Kammel | |
| 6,110,242 A | 8/2000 | Young | |
| 6,117,340 A | 9/2000 | Carstens | |
| 6,210,457 B1 | 4/2001 | Siemers | |
| 6,238,579 B1 | 5/2001 | Paxton et al. | |
| 6,251,296 B1 | 6/2001 | Conrad et al. | |
| 6,511,599 B2 | 1/2003 | Jaroszczyk et al. | |
| 6,531,066 B1 | 3/2003 | Saunders et al. | |
| 6,613,231 B1 | 9/2003 | Jitariouk | |
| 6,790,346 B2 | 9/2004 | Caleffi | |
| 6,896,720 B1 | 5/2005 | Arnold et al. | |
| 7,166,230 B2 | 1/2007 | Nilsen et al. | |
| 7,316,067 B2 | 1/2008 | Blakey | |
| 7,351,269 B2 | 4/2008 | Yau | |
| 7,632,416 B2 | 12/2009 | Levitt | |
| 7,651,000 B2 | 1/2010 | Knol | |
| 7,785,479 B1 | 8/2010 | Hosford | |
| 7,896,169 B2 | 3/2011 | Levitt et al. | |
| 7,998,251 B2 | 8/2011 | Pondelick et al. | |
| 8,201,697 B2 | 6/2012 | Levitt et al. | |
| 8,663,472 B1 | 3/2014 | Mallard et al. | |
| 8,701,896 B2 | 4/2014 | Levitt et al. | |
| 8,882,999 B2 | 11/2014 | Levitt et al. | |
| 8,960,450 B2 | 2/2015 | Caffell et al. | |
| 9,101,859 B2 * | 8/2015 | Jons ................. B01D 21/0006 | |
| 2003/0029790 A1 | 2/2003 | Templeton | |
| 2003/0221996 A1 | 12/2003 | Svoronos et al. | |
| 2004/0211734 A1 | 10/2004 | Moya | |
| 2005/0109684 A1 | 5/2005 | DiBella et al. | |
| 2007/0039900 A1 | 2/2007 | Levitt | |
| 2007/0075001 A1 | 4/2007 | Knol | |
| 2007/0187328 A1 | 8/2007 | Gordon | |
| 2010/0044309 A1 | 2/2010 | Lee | |
| 2010/0083832 A1 | 4/2010 | Pondelick et al. | |
| 2010/0096310 A1 | 4/2010 | Yoshida | |
| 2011/0120959 A1 | 5/2011 | Levitt et al. | |
| 2011/0160087 A1 | 6/2011 | Zhao et al. | |
| 2011/0220586 A1 | 9/2011 | Levitt | |
| 2012/0010063 A1 | 1/2012 | Levitt et al. | |
| 2012/0145609 A1 | 6/2012 | Caffell et al. | |

FOREIGN PATENT DOCUMENTS

| | | | |
|---|---|---|---|
| DE | 19914674 | 12/2000 | |
| DE | 10001737 | 10/2001 | |
| DE | 102005027509 | 12/2006 | |
| EP | 0018168 A2 * | 10/1980 | ......... B01D 19/0057 |
| EP | 0375671 | 6/1990 | |
| EP | 0475252 | 3/1992 | |
| EP | 0380817 | 1/1993 | |
| EP | 0566792 | 10/1993 | |
| EP | 0429409 | 4/1994 | |
| EP | 2082793 | 7/2009 | |
| FR | 2791904 | 10/2000 | |
| GB | 2007118 | 5/1979 | |
| GB | 2309182 | 7/1997 | |
| GB | 2423264 | 8/2006 | |
| JP | 2006068690 | 3/2006 | |
| KR | 2004105165 | 12/2004 | |
| KR | 899416 | 5/2009 | |
| WO | 0218056 | 3/2002 | |
| WO | 03026832 | 4/2003 | |
| WO | 2004064978 | 8/2004 | |
| WO | 2011160087 | 12/2011 | |
| WO | 2012154448 | 11/2012 | |
| WO | 2014066036 | 10/2013 | |
| WO | 2013173115 | 11/2013 | |
| WO | 2013181028 | 12/2013 | |
| WO | 2013181029 | 12/2013 | |

OTHER PUBLICATIONS

Clean Filtration Technologies, Inc. CFT Turboclone Demo System, 2010.
Clean Filtration Technologies, Inc. CFT Turboclone TC-201 Technical Datasheet, 2010.

* cited by examiner

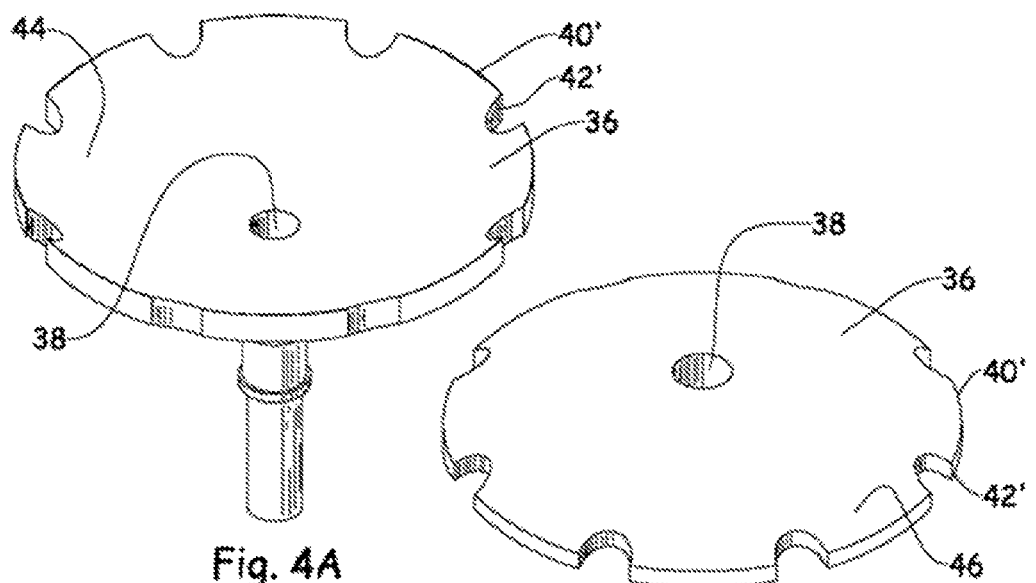
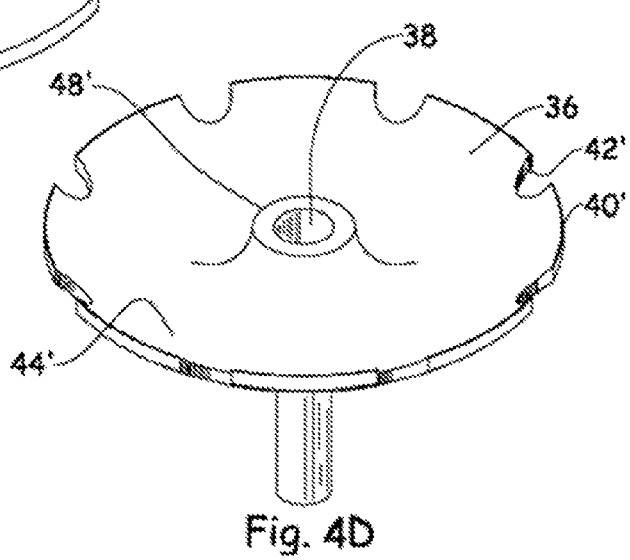

HYDROCLONE

TECHNICAL FIELD

The invention is directed toward hydroclones and systems for separating constituents of liquid mixtures.

BACKGROUND

Various techniques have been utilized to separate suspended particles from liquids including coagulation, flocculation, sedimentation, filtration and cyclonic separation. For example, in a typical hydroclone embodiment, pressurized feed liquid is introduced into a conically shaped chamber under conditions that create a vortex within the chamber. Feed liquid is introduced near the top of a conical chamber and an effluent stream is discharged near the bottom. Centrifugal forces associated with the vortex urge denser particles towards the periphery of the chamber. As a result, liquid located near the center of the vortex has a lower concentration of particles than that at the periphery. This "cleaner" liquid can then be withdrawn from a central region of the hydroclone. Examples of hydroclones are described in: U.S. Pat. No. 3,061,098, U.S. Pat. No. 3,529,544, U.S. Pat. No. 4,414,112, U.S. Pat. No. 5,104,520, U.S. Pat. No. 5,407,584 and U.S. Pat. No. 5,478,484. Separation efficiency can be improved by including a filter within the chamber such that a portion of the liquid moving to the center of the chamber passes through the filter. In such embodiments, cyclonic separation is combined with cross-flow filtration. Examples of such embodiments are described in: U.S. Pat. No. 7,632,416, U.S. Pat. No. 7,896,169, U.S. Pat. No. 8,201,697 and US2012/0010063.

Size and separation efficiency are limiting factors for any given separation system. For example, while flocculation and sedimentation techniques are relatively energy efficient, they typically require settling ponds and long separation times. Hydroclones offer a smaller footprint, but have higher energy demand and are less effective at removing small particulate matter. Cross-flow filtration systems are small and produce high quality separations but are prone to fouling and are energy intensive. New systems are sought which offer an improved balance of attributes including overall size, separation efficiency and energy efficiency.

SUMMARY

The invention includes multiple embodiments of hydroclones, hydroclone systems and methods for their corresponding use. In one embodiment, the invention includes a hydroclone (10) including: a tank (12) comprising an inlet (14), an effluent outlet (18), a process fluid outlet (20) and an inner peripheral wall (22) enclosing: a vortex chamber (24) in fluid communication with the inlet (14), a process fluid chamber (32) in fluid communication with the process fluid outlet (20), an effluent separation chamber (30) located between the vortex chamber (24) and process fluid chamber (32) and including an outer circumferential surface (23), a vortex flow barrier (34) located between the vortex chamber (24) and the effluent separation chamber (30), the vortex flow barrier (34) providing at least one opening (42) near the outer circumferential surface (23) of the of the effluent separation chamber (30) which is adapted to allow liquid from the vortex chamber (24) to pass into the effluent separation chamber (30) near the outer circumferential surface (23); an effluent barrier (36) located between the effluent separation chamber (30) and the process fluid chamber (32) including at least one opening (42') near the outer circumferential surface (23) which is adapted to allow liquid from the effluent separation chamber (30) to pass into the process fluid chamber (32) near the outer circumferential surface (23); and an effluent opening (38) centrally located within the effluent separation chamber (30) in fluid communication with the effluent outlet (18); wherein the effluent separation chamber (30) has a median distance (80) between the vortex flow barrier (34) and effluent barrier (36) which is adjustable.

In another embodiment, the invention includes a hydroclone system including: a tank (12) having an inlet (14), an effluent outlet (18), a process fluid outlet (20) and an inner peripheral wall (22) enclosing: a vortex chamber (24) in fluid communication with the inlet (14), a process fluid chamber (32) in fluid communication with the process fluid outlet (20), an effluent separation chamber (30) located between the vortex chamber (24) and process fluid chamber (32) and including an outer circumferential surface (23), a vortex flow barrier (34) located between the vortex chamber (24) and the effluent separation chamber (30), the vortex flow barrier (34) providing at least one opening (42) near the outer circumferential surface (23) of the of the effluent separation chamber (30) which is adapted to allow liquid from the vortex chamber (24) to pass into the effluent separation chamber (30) near the outer circumferential surface (23); an effluent barrier (36) located between the effluent separation chamber (30) and the process fluid chamber (32) including at least one opening (42') near the outer circumferential surface (23) which is adapted to allow liquid from the effluent separation chamber (30) to pass into the process fluid chamber (32) near the outer circumferential surface (23); and an effluent opening (38) centrally located within the effluent separation chamber (30) in fluid communication with the effluent outlet (18); a fluid treatment pathway (28) that extends from the tank inlet (14) and successively through the vortex chamber (24), effluent separation chamber (30) and process fluid chamber (32) and exits the tank (12) by way of the process fluid outlet (18); a recirculation loop (A) comprising the fluid treatment pathway (28) and extending from the process fluid outlet (18) to the inlet (14); and a recirculation pump (Z) located within the recirculation loop (A) that is adapted for moving liquid through the recirculation loop (A).

Many additional embodiments are described.

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

FIGS. 4A-L are perspective views of various embodiments of effluent bathers.

DETAILED DESCRIPTION

The present invention includes a hydroclone adapted for separating constituents of liquid mixtures. Applicable liquid mixtures include liquid-liquid mixtures, liquid-solid mixtures and combinations. Examples include the separation of solid particles from liquid and the separation of emulsified mixtures including liquids of differing densities (e.g. oil and water). Specific applications include the treatment of pulp effluent generated by paper mills, process water generated by oil and gas recovery, bilge water, and municipal and industrial waste water.

Figure 1:
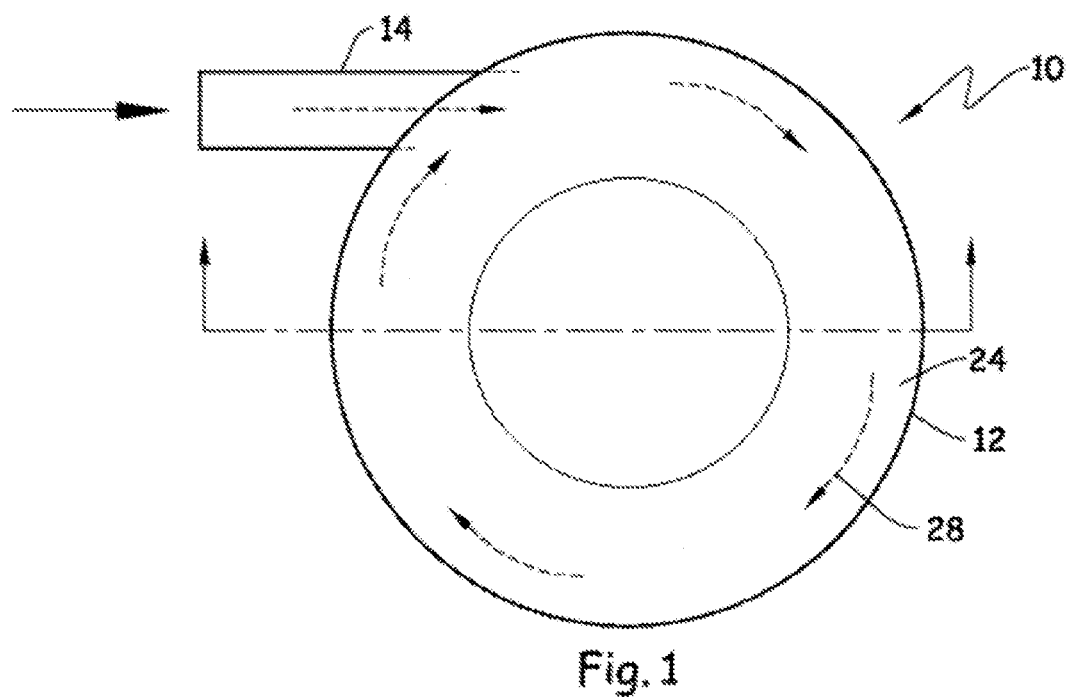
FIG. 1 is an elevational view of an embodiment of the subject hydroclone.
Figure 2:
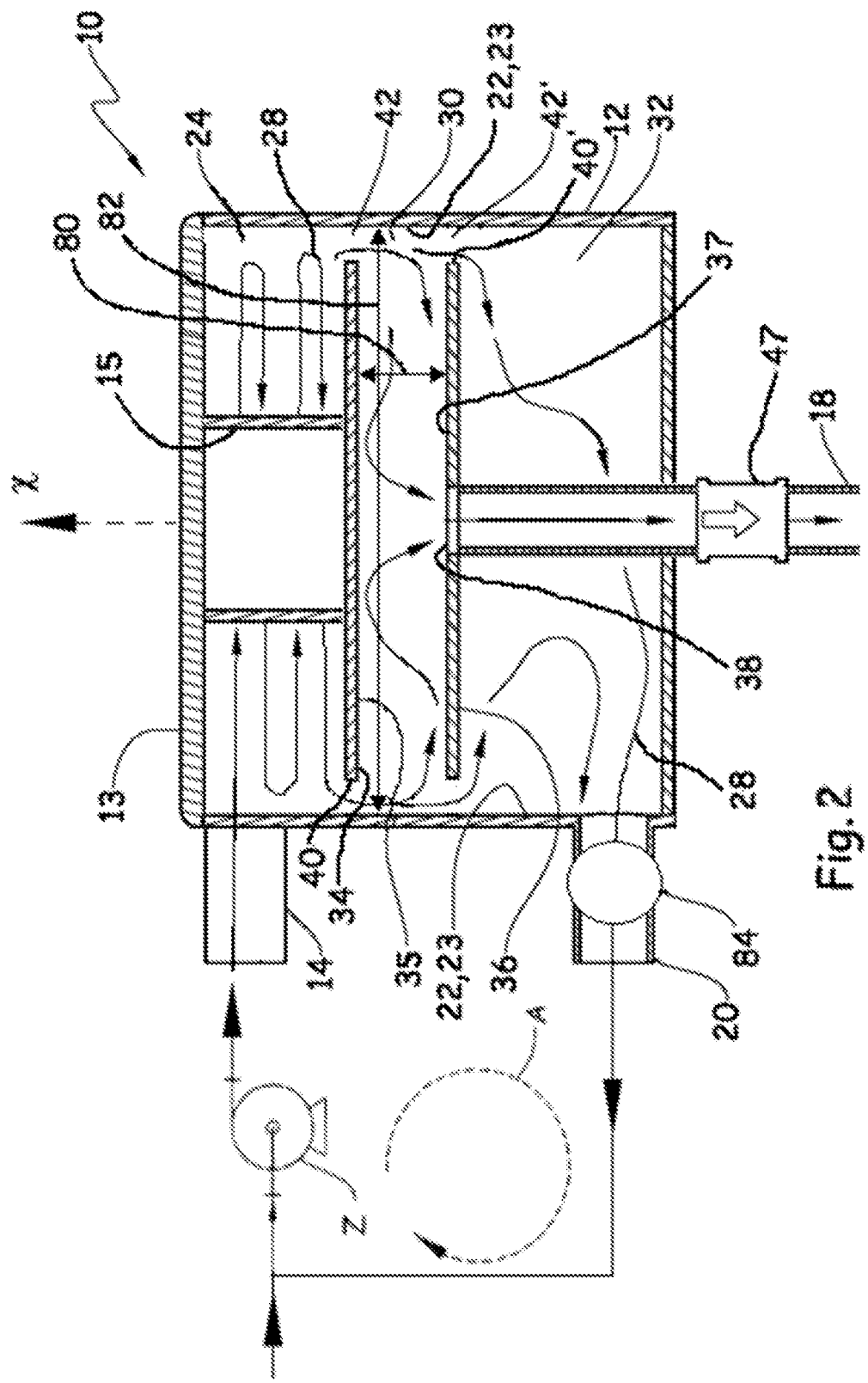
FIG. 2 is a cross-sectional view of the hydroclone of FIG. 1 along with a schematic representation of a hydroclone system including a recirculation loop (A) and recirculation pump (Z).

An embodiment of the invention is illustrated in FIGS. 1 and 2. The illustrated hydroclone (10) comprises a pressurizable tank (12) and lid (13). The tank (12) is preferably rotationally symmetric about a central axis $\chi$. Representative configurations include: generally cylindrical, conical and frusto conical. The tank (12) includes three ports: an inlet (14), an effluent outlet (18) and a process fluid outlet (20). Other embodiments may include additional ports, as will be described in connection with FIG. 6. The tank (12) further includes an inner peripheral wall (22) enclosing at least three chambers (each preferably rotationally symmetric about the central axis $\chi$): a vortex chamber (24), an effluent separation chamber (30) and a process fluid chamber (32). The effluent separation chamber (30) has at least one opening (42, 42') at each opposing end, near its outer circumferential surface (23) that allows fluid to flow between adjacent chambers.

The vortex chamber (24) is in fluid communication with the inlet (14). During operation, pressurized liquid mixture enters the tank (12) by way of inlet (14) and creates a vortex about an optional central member (15) positioned concentric with the central axis $\chi$ within the vortex chamber (24). As illustrated in the figures, the central member (15) may vary in circumference and in some embodiments, may comprise a filter assembly (as will be described in connection with FIGS. 6 and 7).

As shown in FIG. 1, a vortex may be generated by positioning the inlet (14) approximately tangential to the vortex chamber (24). Alternatively, baffles (not shown) upon which fluid flow impinges can induce rotational fluid motion when the inlet (14) is closer to perpendicular, or even when the inlet (14) is aligned along the central axis $\chi$. In other embodiments, driven paddles may be used to create a vortex within the vortex chamber (24).

The effluent separation chamber (30) is located below and in fluid communication with the vortex chamber (24). The effluent separation chamber (30) has an outer circumferential surface (23) near the inner peripheral wall (22) of the tank (12). In operation, the effluent separation chamber (30) receives liquid from the vortex chamber (24), and the majority of liquid is caused to enter and exit the effluent separation chamber (30) at locations near its outer circumferential surface (23). In the embodiment of FIG. 2, the outer circumferential surface (23) of the effluent separation chamber (30) is coincident with the inner peripheral wall (22) of the tank (12). In operation, a small fraction of liquid and a larger fraction of denser effluent (e.g. particulate matter) are removed through a centrally located effluent opening (38) within the effluent separation chamber (30). The effluent opening (38) provides a path through the effluent barrier (36) to the effluent outlet (18) by which effluent may exit the tank (12). The effluent outlet (18) may optionally be in fluid communication with a valve (47) to selectively control removal of effluent from the tank (12).

The process fluid chamber (32) is shown located below and in fluid communication with the effluent separation chamber (30). The process fluid chamber (32) is also in fluid communication with the process fluid outlet (20) by which process liquid may exit the tank (12).

A vortex flow barrier (34) is located between the vortex and effluent separation chambers (24, 30). The vortex flow barrier (34) is designed to maintain vortex fluid flow in the vortex chamber (24), disrupt the vortex as fluid flows from the vortex chamber (24) into the effluent separation chamber (30) and reduce the rotational fluid flow within the effluent separation chamber (30). The vortex flow barrier (24) directs fluid flow between the vortex and effluent separation (24, 30) chambers to locations adjacent to the outer circumferential surface (23) of the effluent separation chamber (30).

Figure 3A:
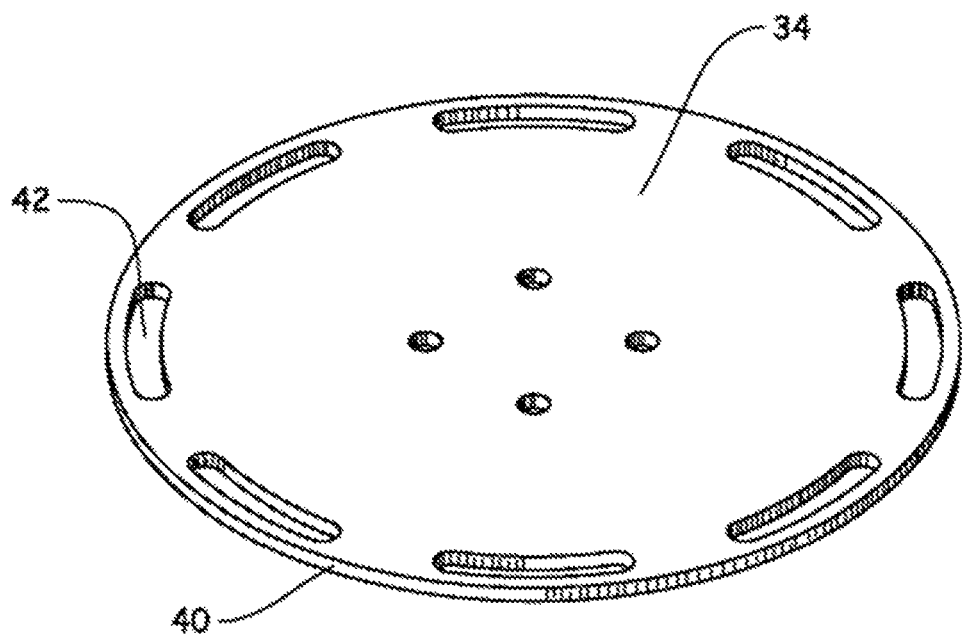
FIGS. 3A-B are perspective views of various embodiments of vortex flow barriers.
Figure 3B:
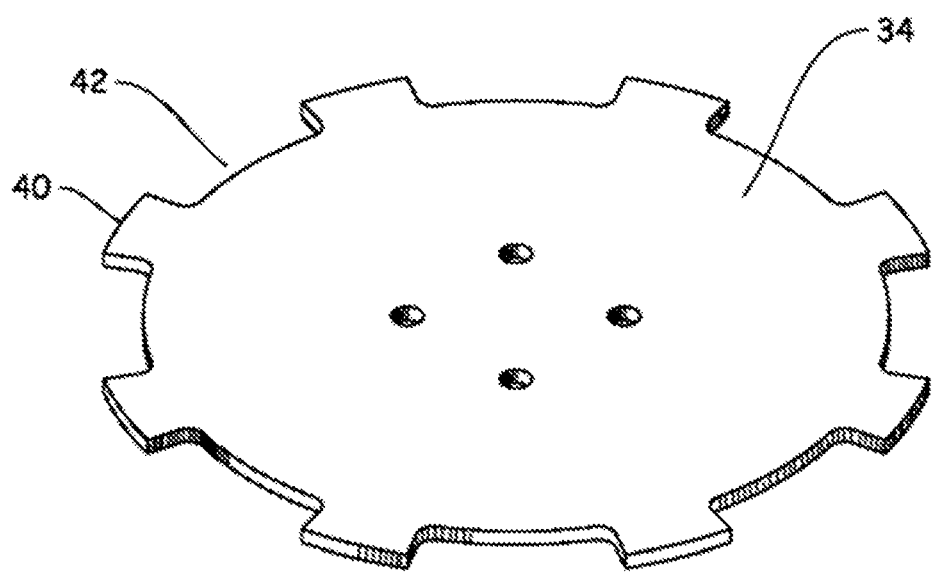

The vortex flow barrier (34) includes an outer periphery (40) that extends to locations adjacent to (e.g. within 50 mm, 25 mm or even 10 mm) or in contact with the outer circumferential surface (23) of the effluent separation chamber (30). The vortex flow barrier (34) provides at least one opening (42) near the outer circumferential surface (23) of the effluent separation chamber (24) that allows rotating fluid from the vortex chamber (24) to enter the effluent separation chamber (30). In the embodiment of FIG. 2, the vortex flow barrier (34) has outer periphery (40) that includes no apertures and extends to locations adjacent to (e.g. within 50 mm, 25 mm or even 10 mm) the outer circumferential surface (23) of the effluent separation chamber (30), forming an annular opening between chambers. Alternatively, the vortex flow barrier (34) may include a plurality of apertures (42) located near its periphery (40) and extending therethrough. The size and shape of apertures (42) is not particularly limited, e.g. scalloped-shaped, slots, elliptical, etc. Non-limiting examples are illustrated in FIG. 3.

Figure 5:
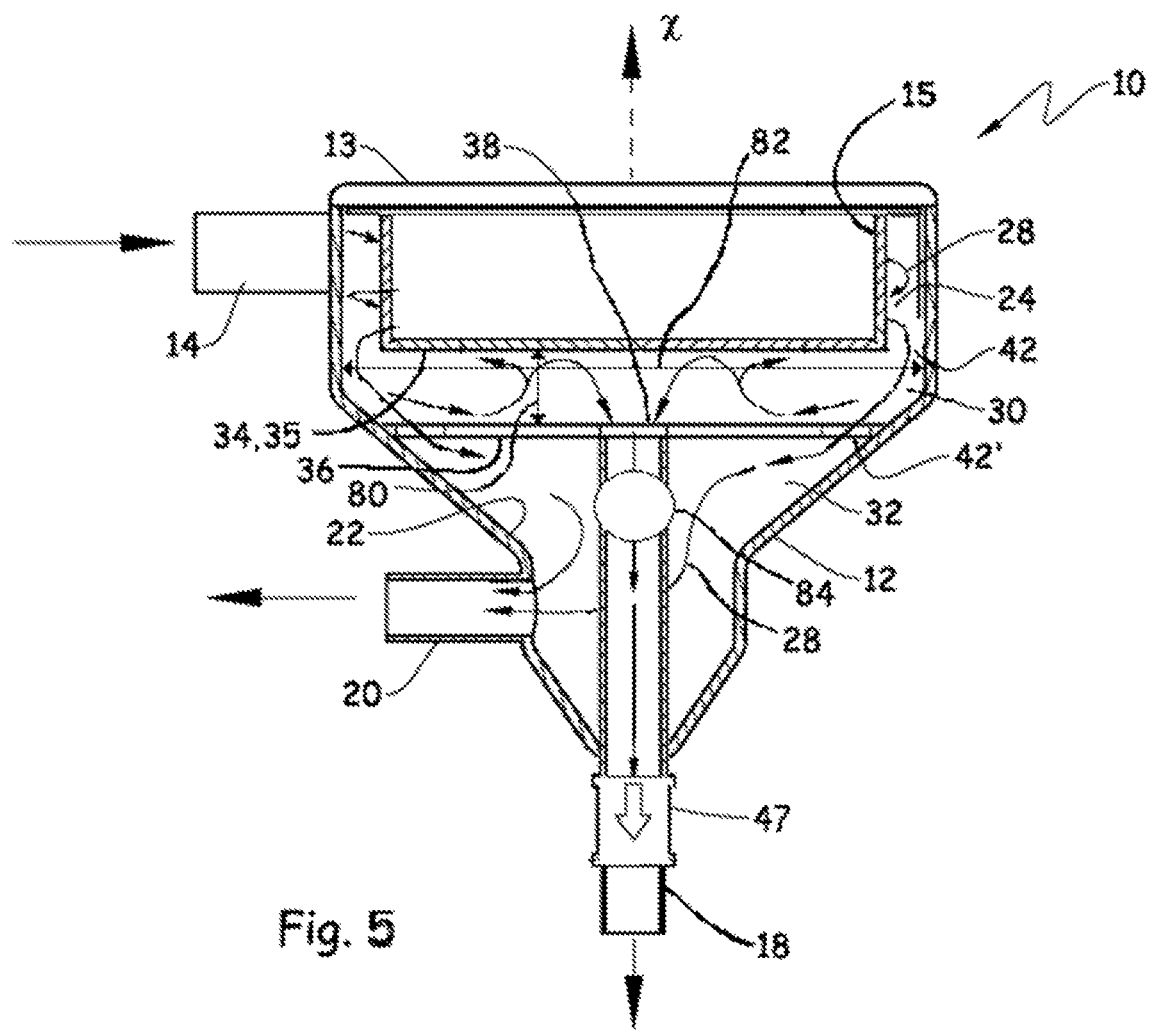
FIG. 5 is a cross-sectional view of an alternative embodiment of a hydroclone.

The vortex flow barrier (34) is designed to control the flow of liquid through the chambers of the tank (12) with a majority (e.g. preferably at least 75%, at least 80%, and in some embodiments all) of volumetric flow passing into the effluent separation chamber (30) being preferentially directed to locations near (e.g. within at least 50 mm, 25 mm or even 10 mm) its outer circumferential surface (23). With that said, a minority (e.g. less than 50% and more preferably less than 25% and still more preferably less than 10%) of the fluid flow may be directed to alternative locations including the center location. While the illustrated embodiments in FIGS. 2-3 depict the vortex flow barrier (34) with a flat surface (35) or plate configuration, the barrier (34) may assume other surface configurations including one having an angled or curved surface. For example, a cone- or bowl-shaped surface may either decrease or increase the volume of the central region of the effluent separation chamber (30), depending on whether the surface (35) is generally concave up or down. In yet another alternative embodiment shown in FIG. 5, a lower edge (35) of the central member (15) positioned concentric with the central axis $\chi$ within the vortex chamber (24) serves as the vortex flow barrier (34).

Figure 4E:
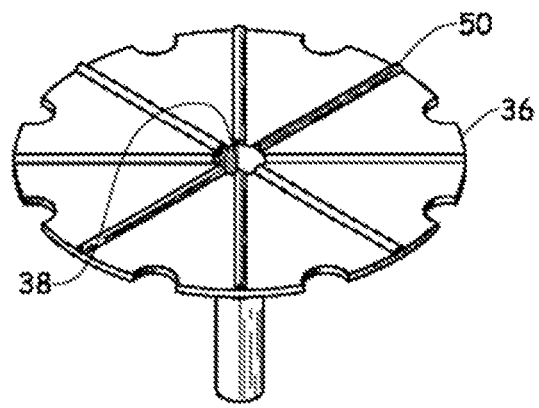
Figure 4F:
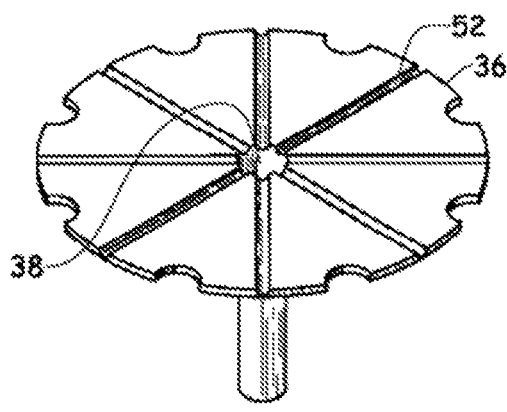
Figure 4G:
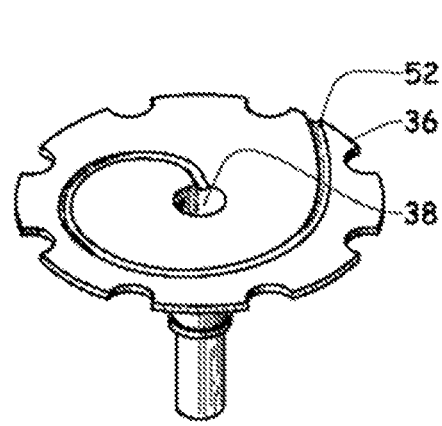
Figure 4H:
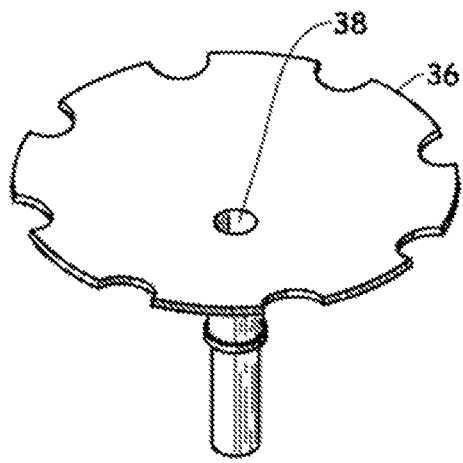
Figure 4I:
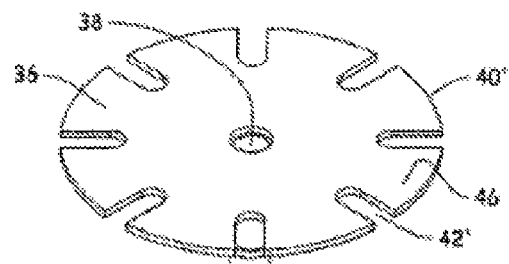
Figure 4J:
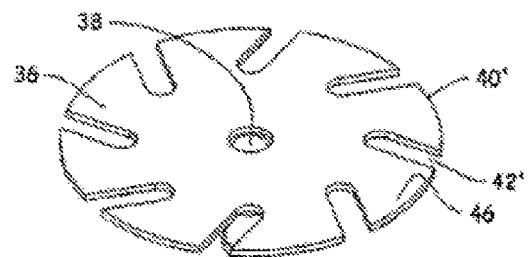
Figure 4K:
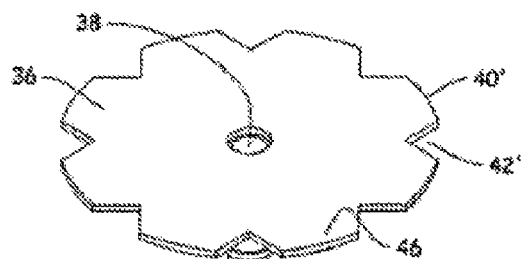
Figure 4L:
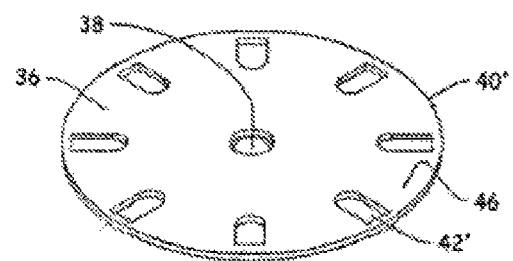

An effluent barrier (36) is located between the effluent separation chamber (30) and the process fluid chamber (32). The effluent barrier (36) provides at least one opening (42') near the outer circumferential surface (23) of the effluent separation chamber (30) that allows a majority of liquid entering the effluent separation chamber (30) to pass into the process fluid chamber (32). As described with respect to the vortex flow barrier (34), the opening (42') may be an annular region formed between the effluent barrier (36) and the outer circumferential surface (23) of the effluent separation chamber (30). The selection of a preferred configuration of the effluent barrier (36) will depend upon the operating conditions and composition of the feed mixture. However, a variety of representative embodiments for the effluent barrier (36) are illustrated in FIGS. 4A-L. For example, rather than utilizing a flat plate-like configuration (e.g. circular flat surface having an outer periphery (40'), the effluent barrier (36) may include alternative configurations wherein a central region, (i.e. directly adjacent the effluent opening (38)) is located at a lower or higher position relative to the periphery (40'). FIG. 4A illustrates a bowl-like configuration including an upward facing concave surface (44'). While shown as including a constant degree of curvature, the degree of curvature may vary across the surface (44'). FIG. 4B illustrates a similar design including an upward facing convex surface (46). FIG. 4C illustrates an embodiment having a plate-like configuration including a raised wall (48) about the effluent opening (38). FIG. 4D illustrates an embodiment including shared features from both FIGS. 4A and 4C, i.e. a concave surface (44') and a raised wall (48') about the effluent opening (38). FIGS. 4E-F illustrate plate-like configurations which may include one or more radially extending ridges (50) and grooves (52), whereas FIG. 4G illustrates the use of a spiral shaped groove (52). While not shown, ridges and grooves (whether radial or spiral), may also be combined together or used separately with the configurations illustrated in FIGS. 4A-D. Each of the illustrated embodiments is designed to facilitate collection of denser materials or particles based upon the specific feed flow conditions and composition. FIG. 4H shows a preferred embodiment including a conical shape including a conical angle of about 80° (i.e. 80° from a vertical axis, 10° from a horizontal axis). Preferred conical angles are from 45° to 85°. While not illustrated, many of these illustrated features are also applicable to the vortex flow barrier (34), e.g. convex and concave upward facing surfaces. While in one embodiment the effluent barrier (36) includes scalloped-shaped apertures (42'), alternatively shaped apertures may also be used including radial slots, angled slots and triangular openings located about the outer periphery (40'), as illustrated in FIGS. 4I-L. Similarly, alternatively shaped apertures (42') may be used with respect to the vortex flow barrier (34). The shape and size of the aperture (42') may be designed to control the flow of fluid downward through the chambers (24, 30, 32) of the tank (12), with flow being preferentially directed to regions near the outer circumferential surface (23) of the effluent separation chamber (30). With that said, a minority (e.g. less than 10% and more preferably less than 2.5% and still more preferably less than 1%) of the downward flow (i.e. non-effluent fluid with respect to the effluent barrier (36)) may occur at alternative locations including the center location of one or both barriers (34, 36). As illustrated in FIG. 2, one or both of the vortex flow barrier (34) and effluent barrier (36) may include outer peripheries that do not contact the inner peripheral wall (22) of the tank (12) and include no apertures.

The vortex flow barrier (34) and effluent barrier (36) include respective upper and lower surfaces (35, 37) that define a median (vertical) distance (80) of the effluent separation chamber (30). A median diameter (82) of the effluent separation chamber (30) can also be determined from the distance between opposite points on the outer circumferential surface (23). A preferred median distance (80) is between 3 cm and 50 cm, more preferably between 6 cm and 30 cm. A preferred median diameter (82) is between 10 cm and 60 cm, more preferably between 20 cm and 50 cm. In a preferred embodiment, the median distance (80) is adjustable. For example, the location of vortex flow and effluent barriers (34, 36) along the central axis χ may be set (or changed) for a given application, depending upon various operating parameters, e.g. composition of the liquid feed mixture, operating pressures, recycle rates, desired permeate quality, etc. This feature of adjustability may be achieved using a variety of means, e.g. by replacing barriers (34, 36) with barriers of a different dimension, by fitting the barriers (34, 36) with adjustable set screws, etc. In one embodiment, one or both barriers (34, 36) are equipped with springs, elastomers, or other deflectable means which allow movement along the central axis χ when subject to a predetermined load. In another embodiment, the median distance (80) between the vortex flow barrier (34) and the effluent barrier (36) is adjustable during operation.

Interactions of the liquid mixture with the vortex flow barrier (34) and the effluent barrier (36) facilitate conversion of rotational velocity to circulating radial flow paths that encroach upon the central region of the effluent separation chamber (30). These flow paths result in a fluid velocity directing denser effluent (e.g. particulate matter) toward the effluent opening (38). In a preferred embodiment, the ratio of the median distance (80) to the median diameter (82) of the effluent separation chamber (30) is between 0.1 and 0.8 and more preferably between 0.3 and 0.5. Depending upon the nature of the liquid mixture, smaller ratios may lack the preferred radial flow to encroach on the central region and larger ratios may generate asymmetric circulations.

Figure 6:
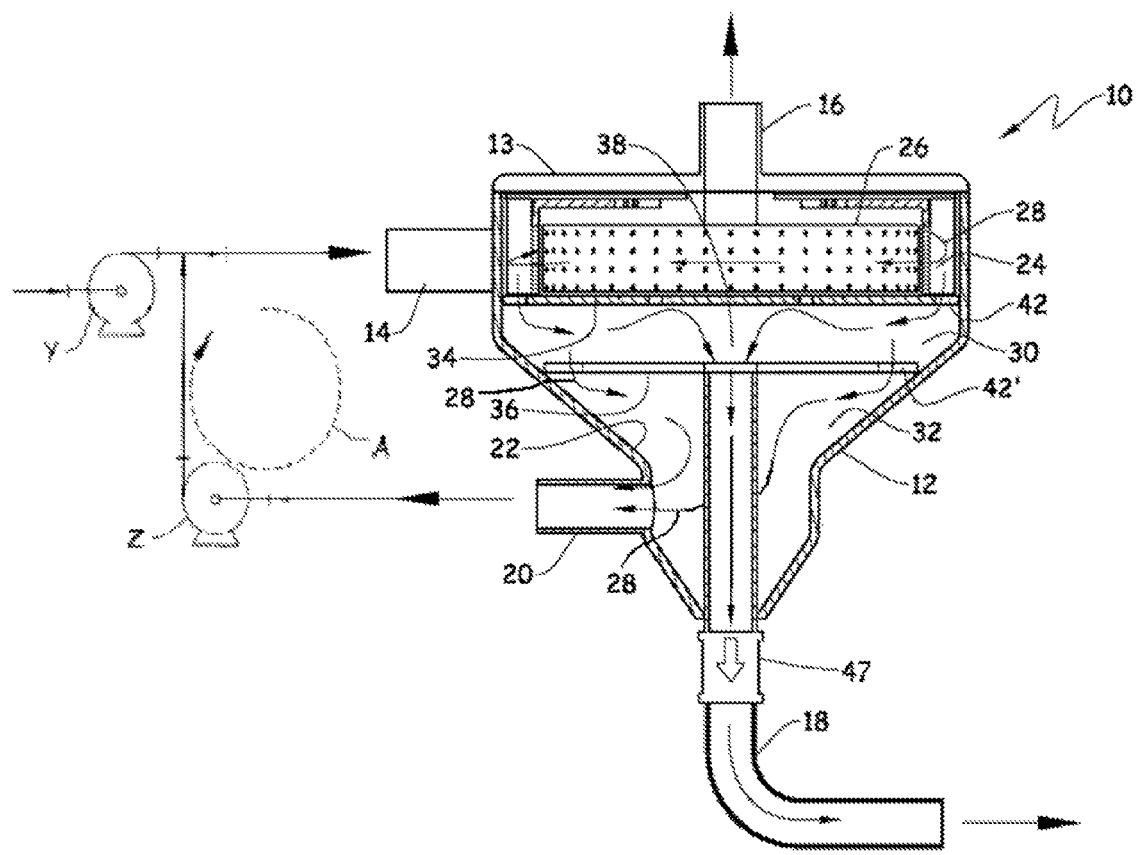
FIG. 6 is a cross-sectional view of an alternative embodiment of a hydroclone system.

The hydroclone (10) may include a sensor (84) for detecting and monitoring changes in the nature of the liquid passing through various locations of the hydroclone (10). Information collected by the sensor may be used to optimize the median distance (80) or other operating conditions, e.g. flow rates, recycle rates, etc. The sensor (84) may be located within the tank (12) or ports and may be used to evaluate liquid from a specific region (e.g. a region below the effluent opening (38) or the process fluid chamber (32)). In embodiments where the hydroclone (10) is incorporated into a system comprising a recirculation loop (A) (as shown in FIGS. 2 and 6), a sensor (84) may be located to detect changes in the number or type of particles within the recirculation loop. Example sensors are those that measure a wide range of parameters including but not limited to: turbidity, light absorbance, density, conductivity, or particle size distribution.

Figure 7:
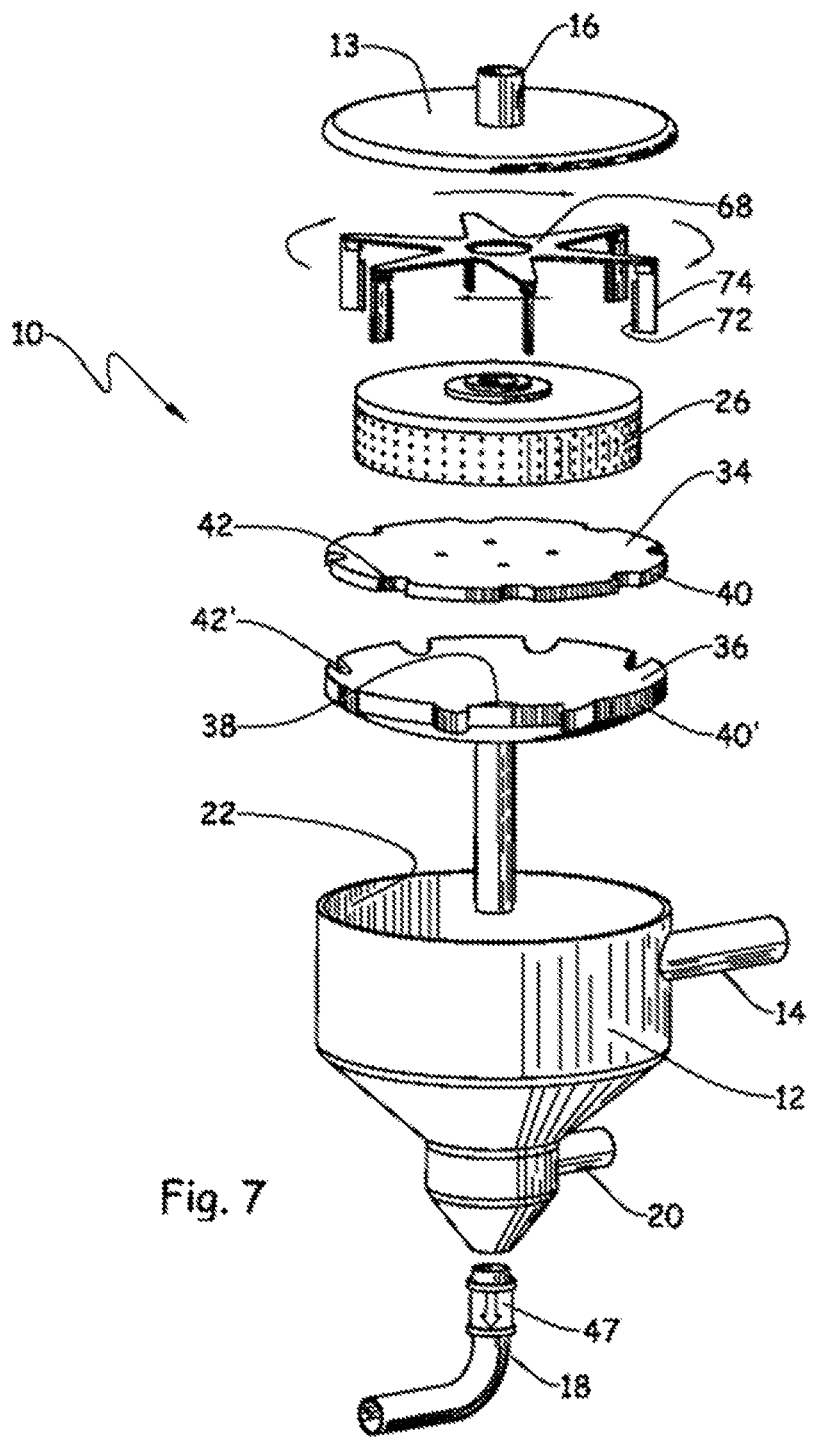
FIG. 7 is an exploded view of the hydroclone of FIG. 6.
Figure 8A:
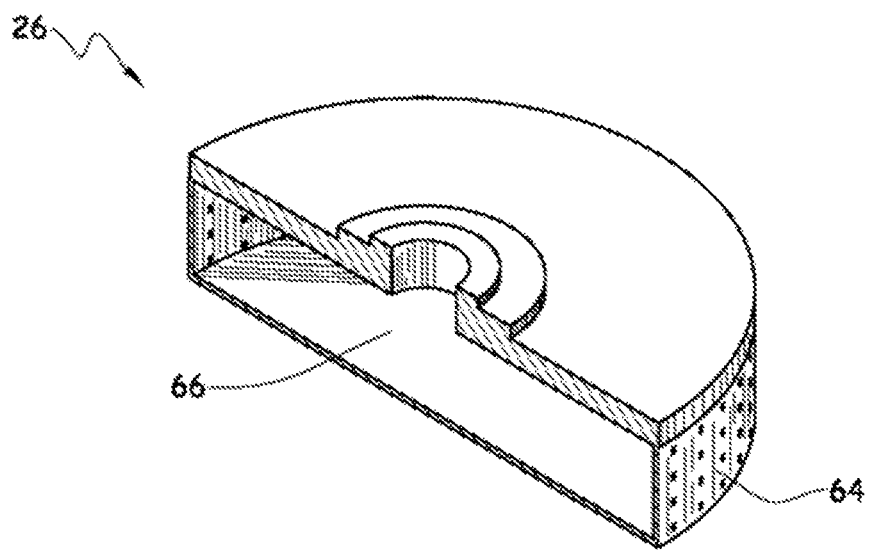
FIG. 8A is a cross-sectional perspective view of a filter assembly.
Figure 8B:
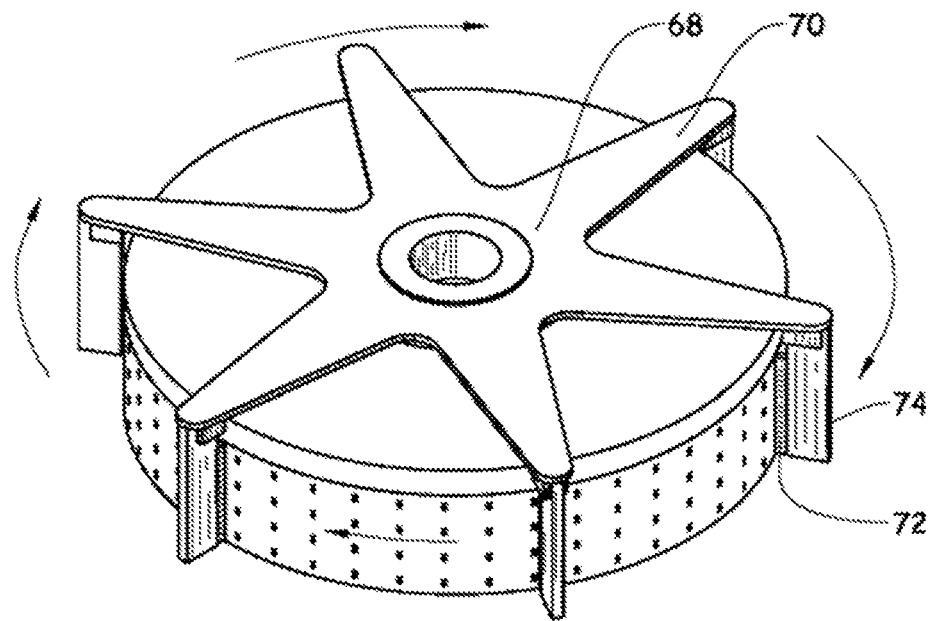
FIG. 8B is a perspective view of a filter assembly and cleaning assembly.

As shown in FIGS. 6 and 7, an optional filter assembly (26) may be centrally located within the vortex chamber (24) and evenly spaced from the inner peripheral wall (22) of the tank (12). While a cylindrical shape is preferred, other configurations may be used including stepped and conical shaped filters. As best shown in FIGS. 8A-B, the filter assembly (26) includes a porous membrane (64) which may be fabricated from a wide variety of materials include polymers, ceramics and metals. In one embodiment, the membrane is relatively thin, e.g. from 0.2-0.4 mm and is supported by an underlying rigid frame or porous support (not shown). A representative example is described in US2012/0010063. The pore size (e.g. 1 to 500 micron), shape (e.g. V-shape, cylindrical, slotted) and uniformity of the membrane (64) may vary depending upon application. In many preferred embodiments, the membrane (64) comprises a corrosion-resistant metal (e.g. electroformed nickel screen) including uniform sized pores having sizes from 10 to 100 microns. Representative examples of such materials are described: U.S. Pat. No. 7,632,416, U.S. Pat. No. 7,896,169, US2011/0120959, U.S. 2011/0220586 and US2012/0010063, the entire subject matter of which is incorporated herein by reference. The membrane (64) surrounds a filtrate chamber (66) that is in fluid communication with the filtered fluid outlet (16).

The subject hydroclone system (10) may further include a cleaning assembly (68) for removing debris from the membrane surface (64) of the filter assembly (26). A representative embodiment is illustrated in FIG. 7B wherein the assembly (68) is mounted on the top surface of the filter assembly (26) and includes one or more spokes (70) extending radially outward. A brush (72) extends downward from the end of the spoke (70) and engages (e.g. touches or comes very near to) the surface of the membrane substrate (64). While shown as a brush (72), alternative cleaning means may be included including wipers, squeegees or scrappers. From 2 to 50 brushes, and preferably from 18 to 24 brushes are used in most embodiments. As represented by curved arrows, the cleaning assembly (68) rotates about filter assembly (26) such that the brush (72) sweeps the surface of the membrane substrate (54) and removes debris, e.g. by creating turbulence near the surface or by directly contacting the surface. One or more paddles (74) may be mounted to the end of at least one spoke (70) such that fluid flowing into the vortex chamber (24) rotates the cleaning assembly (68) about the filter assembly (26). Spacing paddles (74) evenly about the filter assembly adds stability to the rotating movement of the cleaning assembly (68) and may help maintain vortex fluid flow in the vortex chamber (24). While shown as extending radially outward from the surface of the membrane substrate (64), the paddles may be slanted, (e.g. from −5° to −30° or 5° to 30° from the radial axis) to increase rotational velocity. Bearings may be used between the filter and cleaning assemblies (26, 68) to further facilitate rotation without impeding vortex fluid flow. In alternative embodiments not shown, the cleaning assembly (68) may be driven by alternative means, e.g. electronic motor, magnetic force, etc. In yet another embodiment, the filter assembly may move relative to a fixed cleaning assembly. In another embodiment, the cleaning assembly (68) may be concentrically located within and rotationally engaged with a surrounding membrane surface (64).

FIGS. 2 and 6 illustrate hydroclone systems further including a fluid treatment pathway (28) that extends from the tank inlet (14) and successively through the vortex chamber (24), effluent separation chamber (30) and process fluid chamber (32) and exits the tank (12) by way of the process fluid outlet (18). In operation, pressurized feed fluid (e.g. preferably from 4 to 120 psi) enters the tank (12) via the inlet (14) and follows along a fluid treatment pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the filter assembly (26) into a filtrate chamber (66) and may subsequently exit the tank (12) as "filtrate" by way of the filtered fluid outlet (16). The remaining "non-filtrate" flows downward from the vortex chamber (24) to the effluent separation chamber (30). The vortex flow barrier (34) preferably directs the majority (e.g. preferably at least 75% and in some embodiments at least 90%) of such downward flow to locations along or adjacent to an inner peripheral wall (22) of the tank (12). This arrangement is believed to help maintain vortex flow within the vortex chamber (24) while disrupting the vortex flow as fluid enters the effluent separation chamber (30). Fluid flow slows in the effluent separation chamber (30) and denser materials (e.g. particles) preferentially settle toward the center of the effluent barrier (34) and enter into the effluent opening (38) and may then exit the tank by way of effluent outlet (18). The effluent outlet (18) may optionally include a valve (47) (e.g. one-way check value) to selectively control removal of effluent from the tank (12). The remaining liquid (hereinafter referred to as "process fluid") in the effluent separation chamber (30) flows downward into the process fluid chamber (32). The effluent barrier (36) directs a majority (e.g. preferably at least 75% and in some embodiments at least 90%) of fluid flow between the effluent separation chamber and process fluid chambers (34, 36) to locations along or adjacent to the outer circumferential surface of the effluent separation chamber, i.e. through apertures (42'). In most applications, process fluid represents a mid-grade product that may be re-used, disposed of or recycled back to the inlet (14) for further treatment. "Filtrate" typically represents a high grade product that may be re-used or disposed of. "Effluent" represents a low grade product that may be further treated or disposed of. However, it should be appreciated that in some applications, effluent may represent a valuable product.

The systems shown in FIGS. 2 and 6 further include a recirculation loop (A) including the fluid treatment pathway (28), which extends from the process fluid outlet (18) to the inlet (14); and a recirculation pump (Z) located within the recirculation loop (A) that is adapted for moving liquid through the recirculation loop (A). The effluent outlet (18) resides outside the recirculation loop (A). In one operational mode, the hydroclone (10) is operated with valve (47) substantially closed to prevent release of effluent from the tank (12). In a preferred operating sub-mode, more than 95%, or even more than 99% of time-averaged fluid volume entering the effluent separation chamber (30) passes to the process fluid chamber (32). As a consequence, incorporating a recirculation loop (A) increases the number of passes though the tank (12) and the probability that effluent (e.g. a given particle) will be separated from the fluid flow.

In another embodiment, the recirculation loop (A) is pressurizable. FIG. 6 shows such an embodiment with two pumps. A recirculation pump (Z) is adapted for moving pressurized fluid through the recirculation loop (A), and a feed pump (Y) resides outside the recirculation loop (A) and is adapted to introduce feed liquid at elevated pressure into the recirculation loop (A). In a preferred embodiment, the feed pump (Y) is adapted to provide a greater pressure increase than provided by the recirculation pump (Z), and the recirculation pump (Z) is adapted to drive at least twice the volume of liquid through the recirculation loop (A) as introduced by the feed pump (Y). More preferably, the recirculation pump (Z) drives at least four times volume of liquid through the recirculation loop (A).

When a system includes both a filter assembly (26) and an effluent separation chamber (30) in series along the fluid treatment pathway (28), the use of separate pumps (Y,Z) provides further advantages. As each pass along the fluid treatment pathway (28) results in only partial removal of effluent from the system, several passes are typically required. For cross-flow filtration to be effective within the vortex chamber (24), the initial applied feed liquid pressure must exceed the transmembrane pressure of the filter assembly. Uniform flux along the fluid treatment path (28) is more readily attained when systems are designed for a higher transmembrane pressure, so that the pressure drop between opposite ends of the cross-flow filter assembly (26) is a small fraction (e.g. less than 20%, 10%, or 1%) of that applied to the membrane. Since pressure drops associated with each operating zone and pass are cumulative, a system designed around a single pump can have substantial efficiency losses through re-pressurization of each pass. By contrast, if a feed pump (Y) is used to provide a pressurized liquid to a pressurized recirculation loop driven by a recirculation pump (Z), the energy losses on successive passes associated with re-pressurizing to a transmembrane pressure and any filtrate back-pressure are avoided. The recirculation pump (Z) needs only to supply energy to drive fluid through the recirculation loop, and, in some embodiments, create relative motion between the membrane surface (64) and a cleaning assembly (68). Using separate pumps to provide pressure and volume requirements is particularly advantaged when the recirculation pump (Z) drives a volume of liquid through the recirculation loop that is at least twice, more preferably at least four times, the volume of feed liquid introduced by the feed pump (Y) to the recirculation loop.

Experiments have demonstrated that removal of effluent (e.g. particles) in the effluent separation chamber (30) is strongly dependent on particle size. Removal efficiency can low be for particles having median particle size of less than 50 microns. During filtration, particles may be agglomerated and/or compacted and then removed by the cleaning assembly, increasing their removal rate in the effluent separation chamber (30). At the same time, removal of particulate by the effluent separation chamber (30) helps maintain high flux in filtration.

In another embodiment, the system may include a plurality of effluent separation chambers (30) and/or filter assemblies (26) ganged together in parallel to a common recirculation pump (Z). The recirculation pump (Z) may simultaneously drive flow through two or more parallel filter assemblies (26) within the recirculation loop. Similarly, the recirculation pump (Z) may drive flow through two or more effluent separation chambers (30) within the recirculation loop (A). Preferably, the recirculation pump (Z) drives flow through parallel pressurizable tanks (12) comprising both a filter assembly (26) and an effluent separation chamber (30). The pressurized recirculation loop (A) may be fed by a common feed pump (Y).

The filter assembly (26) is preferably operated with recoveries less than 50%, 25%, or even 10%, allowing both a high cross-flow velocity and high cleaning rates. (Although cleaning is continuously performed, short times exist between discrete engagements of the rotatable cleaning assembly (68) with any given location on the membrane (64). Particles within a given pass through the effluent separation chamber (30) also have a relatively low probability of removal. For example, the probability that a 200 micron plastic sphere (density 1.09) being removed in a given pass may be less than 30%, or even less than 10%. However, due to multiple passes through the recirculation loop (A), the effluent separation chamber (30) has a significant impact in effluent removal.

As previously described, pressure losses from successive passes are minimized by use of the combined feed pump (Y) and recirculation pump (Z). In embodiments using a filter assembly (26), the pressure drop across the membrane (from fluid treatment pathway (28) to the filtrate chamber (66)) can then be a small fraction of the pressure provided by the feed pump (Y), less than 50%, 25%, or even 10%. In a preferred embodiment, at least 50%, more preferably 80%, of the pressure provided by the feed pump (Y) is used to drive a downstream operation (e.g. microfiltration, ultrafiltration, nanofiltration, or reverse osmosis). The pressure drop between locations on the fluid treatment pathway (28) at opposite ends of the cross-flow filter assembly (26) is also preferably small, e.g. less than 20%, 10%, or 1% of pressure supplied by the feed pump (Y).

The inventive hydroclone system (10) may best be combined with a filtration assembly (26). Due to the continuous cleaning, high recirculation, removal and concentration of particles by the effluent separation chamber, and relatively low recoveries in the filtration and effluent separation chambers, the system can operate well with high solids. In operation, the system is preferably operated with an average volumetric recovery of at least 85%, 90%, 95%, or even 99% (i.e. the fraction of liquid that leaves the system through the membrane as filtrate). Preferred particular removal systems may operate with liquid mixtures having solids content greater than 0.2, 0.5, or 1% by mass.

The entire subject matter of each of the US patents mentioned herein references are fully incorporated by reference.

The invention claimed is:

1. A hydroclone (10) comprising: a tank (12) comprising an inlet (14), an effluent outlet (18), a process fluid outlet (20) and an inner peripheral wall (22) enclosing:
    a vortex chamber (24) in fluid communication with the inlet (14),
    a process fluid chamber (32) in fluid communication with the process fluid outlet (20),
    an effluent separation chamber (30) located between the vortex chamber (24) and process fluid chamber (32) and including an outer circumferential surface (23), a vortex flow barrier (34) located between the vortex chamber (24) and the effluent separation chamber (30), the vortex flow barrier (34) providing at least one opening (42) near the outer circumferential surface (23) of the of the effluent separation chamber (30) which is adapted to allow liquid from the vortex chamber (24) to pass into the effluent separation chamber (30) near the outer circumferential surface (23);
    an effluent barrier (36) located between the effluent separation chamber (30) and the process fluid chamber (32) including at least one opening (42') near the outer circumferential surface (23) which is adapted to allow liquid from the effluent separation chamber (30) to pass into the process fluid chamber (32) near the outer circumferential surface (23);
    an effluent opening (38) centrally located within the effluent separation chamber (30) in fluid communication with the effluent outlet (18);
    wherein the effluent separation chamber (30) has a median distance (80) between the vortex flow barrier (34) and effluent barrier (36) which is adjustable; and
    a filter assembly (26) located within the vortex chamber (24) and enclosing a filtrate chamber (66) in fluid communication with a filtered fluid outlet (16) such that liquid passing through the filter assembly (26) enters the filtrate chamber (66) and exits the tank (12) by way of the filtered fluid outlet (16).

2. The hydroclone (10) of claim 1 wherein the effluent separation chamber (30) has a median diameter (82) and wherein the ratio of the median distance (80) to the median diameter (82) is between 0.1 and 0.8.

3. The hydroclone (10) of claim 1 wherein the effluent separation chamber (30) has a median diameter (82) and the ratio of the median distance (80) to the median diameter (82) is between 0.3 and 0.5.

4. The hydroclone (10) of claim 1 further comprising a sensor (84) adapted to detect changes in the nature of the liquid passing through the hydroclone (10).

5. A hydroclone system comprising:
    i) the hydroclone of claim 1 including a fluid treatment pathway (28) that extends from the tank inlet (14) and successively through the vortex chamber (24), effluent separation chamber (30) and process fluid chamber (32) and exits the tank (12) by way of the process fluid outlet (18);

ii) a recirculation loop (A) comprising the fluid treatment pathway (28) and extending from the process fluid outlet (18) to the inlet (14); and iii) a recirculation pump (Z) located within the recirculation loop (A) that is adapted for moving liquid through the recirculation loop (A).

6. The hydroclone system of claim 5 further comprising a feed pump (Y) located outside of the recirculation loop (A) and adapted to introduce feed liquid into the recirculation loop (A).

7. The hydroclone system of claim 5 wherein the recirculation pump (Z) is adapted to drive at least twice the volume of liquid through the recirculation loop (A) as introduced by the feed pump (Y), and wherein the feed pump (Y) is adapted to provide a greater pressure increase than provided by the recirculation pump (Z).

* * * * *